United States Patent [19]

Lambertus

[11] Patent Number: 4,764,100
[45] Date of Patent: Aug. 16, 1988

[54] PERFORATED PLATE FOR THE UNDERWATER GRANULATING OF EXTRUDED STRANDS OF THERMOPLASTIC MATERIAL

[75] Inventor: Friedrich Lambertus, Stuttgart, Fed. Rep. of Germany

[73] Assignee: Werner & Pfleiderer GmbH, Stuttgart, Fed. Rep. of Germany

[21] Appl. No.: 904,689

[22] Filed: Sep. 5, 1986

[30] Foreign Application Priority Data

Sep. 9, 1985 [DE] Fed. Rep. of Germany ....... 3532937

[51] Int. Cl.⁴ .............................................. B28B 11/14
[52] U.S. Cl. ...................................... 425/67; 264/142; 425/311; 425/464; 425/467
[58] Field of Search ................. 425/67, 310, 311, 464, 425/466, 467, 313; 264/142

[56] References Cited

U.S. PATENT DOCUMENTS

| | | | |
|---|---|---|---|
| 3,308,507 | 9/1965 | Black | 425/67 |
| 3,323,170 | 6/1967 | Swiekand et al. | 425/310 |
| 3,516,120 | 6/1970 | Braun et al. | 425/67 |
| 3,749,536 | 7/1973 | Remscheid et al. | 425/464 |
| 4,264,553 | 4/1981 | Loo | 425/313 |
| 4,378,964 | 4/1983 | Wolfe | 425/463 |

Primary Examiner—Jay H. Woo
Assistant Examiner—C. Scott Bushey
Attorney, Agent, or Firm—Roberts, Spiecens & Cohen

[57] ABSTRACT

A perforated plate construction for the underwater granulating of plastic strands comprising a base member with a melt distribution channel and a plurality of inlet channels connected to the melt distribution channel and to extruder nozzles of a cutting plate. The base plate is heated in the region of the inlet channels. Between the base member and the cutting plate is an insulating layer through which the extruder nozzles extend. In order to permit compensation for thermal expansion in the cutting plate without damage to the cutting plate and the insulating layer, the latter is formed as an air gap which is substantially coextensive with the cutting plate in the transverse direction of the extruder nozzles. The cutting plate is supported on the base plate by a plurality of tubular support elements which are separate from each other and freely extended through the air gap.

13 Claims, 3 Drawing Sheets

PERFORATED PLATE FOR THE UNDERWATER GRANULATING OF EXTRUDED STRANDS OF THERMOPLASTIC MATERIAL

FIELD OF INVENTION

The present invention relates to a perforated plate construction for the underwater granulating of strands of thermoplastic material.

More particularly, the invention relates to a perforated plate construction comprising a base member having a melt distributor channel for molten plastic material and a plurality of inlet channels communicating with the melt channel. The base member contains heating means for heating the plastic material in the inlet channels. The inlet channels communicate with extruder orifices in a cutting plate which is connected to the base member through the intermediary of passages in an insulating layer.

PRIOR ART

A perforated plate construction is known from DE OS No. 22 36 823. Therein, the cutting plate consists of a screwable insert which lies flat against the base plate, the part of the cutting plate surrounding the extruder orifices defining with the base plate a gap which is filled with a low heat-conductive material, which extends in the longitudinal as well as the transverse direction of the extruder orifices so as to prevent excessive flow of heat to the cutting plate. The contact of the heated base plate with the attachment surface of the cutting plate produces a high temperature gradient in the cutting plate.

Thus, the cutting surface of the cutting plate, adjacent which the knife travels, can become distorted and interfere with the smooth travel of the knife. Namely, the cutting surface frequently becomes curved since the planar attachment of the cutting plate to the base plate prevents compensation for the thermal expansions which occur in the radial direction, i.e. transverse of the extruder orifices. This compensation takes place via the easily yielding insulating layer, so that the cutting surface lifts off the base plate as a result of thermal expansion.

SUMMARY OF THE INVENTION

An object of the present invention is to overcome this deficiency and to provide a performated plate construction which provides compensation for the thermal expansion which takes place in the region of the cutting plate without damaging the cutting plate and the heat insulation.

In order to achieve this object, the invention provides an insulating air gap which adjoins the cutting plate and is substantially coextensive therewith, the cutting plate being supported on the base plate by a plurality of tubular projecting elements on the base plate which extend through the air gap.

The perforated plate construction, in accordance with the invention, provides a secure, stress-free metallic connection of the cutting plate on the base plate despite differences in temperature therebetween since the plates are connected together at a multiplicity of supports so that thermal stresses within the cutting plate can be compensated within very small partial regions of the cutting plate. In this respect it has been surprisingly found that the tubular elements which serve as support elements for the cutting plate, individually resiliently compensate for the thermal stresses without any detrimental deformation of the cutting surface of the cutting plate. The insulating air gap provides the free space necessary for this resilient compensation and permits the tubular elements to be dimensioned to meet these requirements.

Furthermore, the tubular elements provide a sufficiently stable support of the cutting plate.

In another perforated plate construction known from WO No 81/01980, the cutting plate, with the inclusion of an insulating layer, is firmly secured by weld connections to the base plate whereby thermal stresses in the cutting plate cannot be accommodated due to the absence of a free space.

Due to the present invention, however, a stable metallic support of the cutting plate is obtained by the plurality of freely extending tubular elements whose moment of inertia can be established so that sufficient elasticity is provided to compensate for thermal expansion within the cutting plate despite its attachment to the base plate.

In one perferred embodiment, the extruder passages are formed within the tubular elements and a thin-walled section of each tubular element encloses a respective passage and is surrounded by the insulating air gap thus limiting the cooling of the strand to a region immediately in front of the outlet of the strand and hence reducing the heat transfer from the inlet region of the strand to a minimum.

According to a further feature, the cutting plate can be enclosed at its inner and outer peripheries by projecting webs on the base plate which makes it possible, if necessary to use the free space created by the insulating air gap for control of the temperature of the cutting plate so as to suitably shield it from the base plate in the case of a very large difference in temperature. According to another feature of the invention, the tubular elements are constructed as inserts which can be securely anchored in the base plate and in the cutting plate, so that secure attachment of the cutting plate is assured. The anchoring can be effected, for instance, by a metallic connection by brazing between the tubular elements and the plates.

According to another feature of the invention, the inserts are each formed by an outer member secured to the plates and an inner member having a conical portion. This is favorable from a manufacturing standpoint and provides the smallest possible cross section as well as being unaffected by the guidance of the strand and having a high mechanical load-bearing capacity.

Additionally, the outer members of the inserts occupy a minimum cross-section in the gap.

BRIEF DESCRIPTION OF THE FIGURES OF THE DRAWING

The invention will be described in greater detail with reference to an embodiment shown in the appended drawing.

DETAILED DESCRIPTION OF PREFERRED EMBODIMENTS OF THE INVENTION

Figure 1:
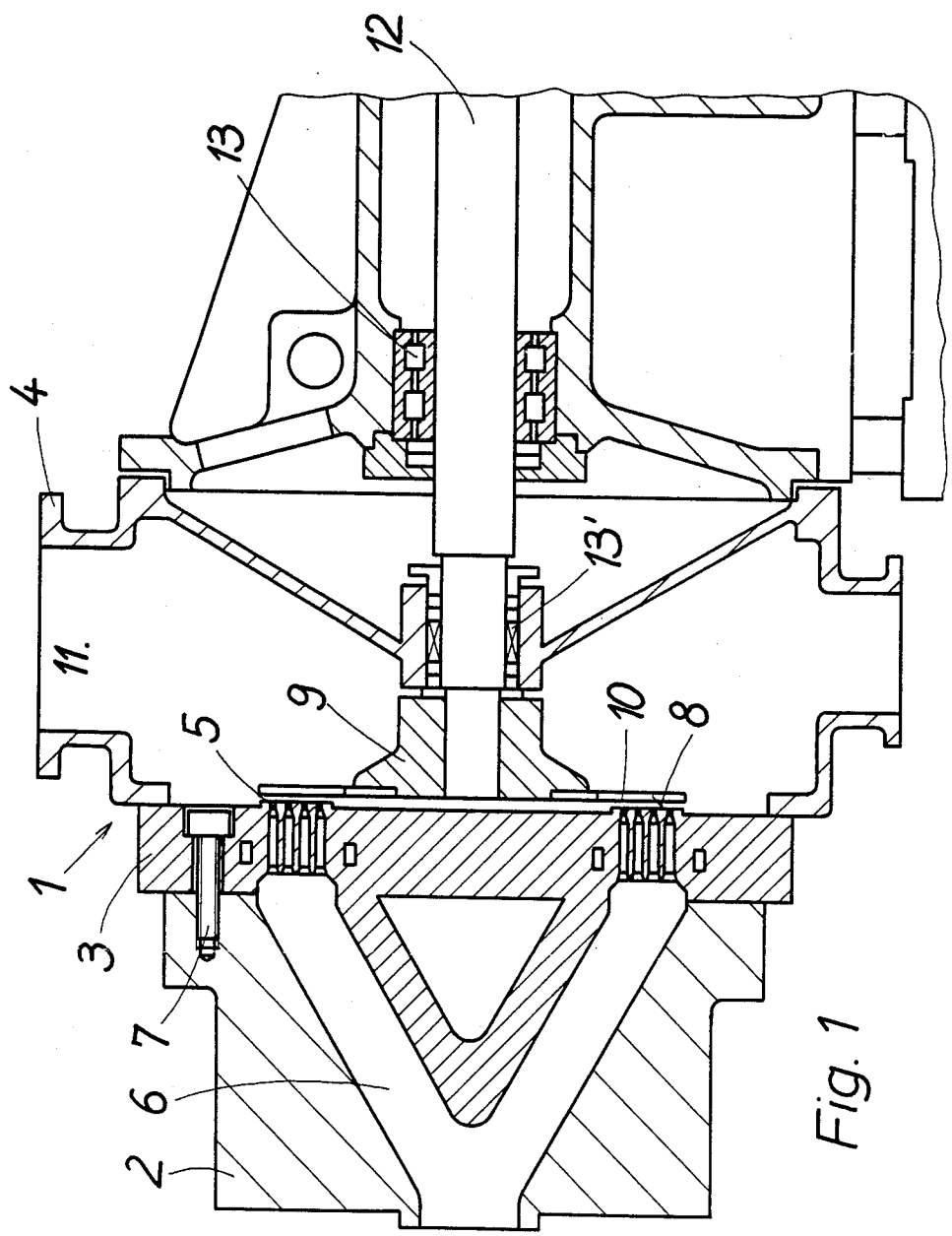
FIG. 1 is a longitudinal section through an underwater granulating device which can be attached by a flange to a screw extruder.

FIG. 1 shows a granulating device 1 which has a perforated plate 3 connected to a head part 2 of a screw extruder (not further shown). In plate 3 are extruder nozzle or orifices 5 for conveying, into granulating hood 4, strands of a molten stream supplied from channels 6 in the head part 2.

The perforated plate 3 is tightly connected to the head part 2 by means of bolts 7.

The molten stream which is conveyed through the extruder nozzles 5 emerges at a cutting surface 8 of the perforated plate 3 in the path of travel of a knife head 9 having a cutting knife 10 which travels closely against the cutting surface 8 to divide the strands of the molten stream into granulate. The granulate is then discharged via a discharge opening 11 by cooling water which fills the granulating hood 4. The knife head 9 is driven in rotation by a shaft 12 which is supported for rotation in anti-friction bearings 13 and 13'.

Figure 2:
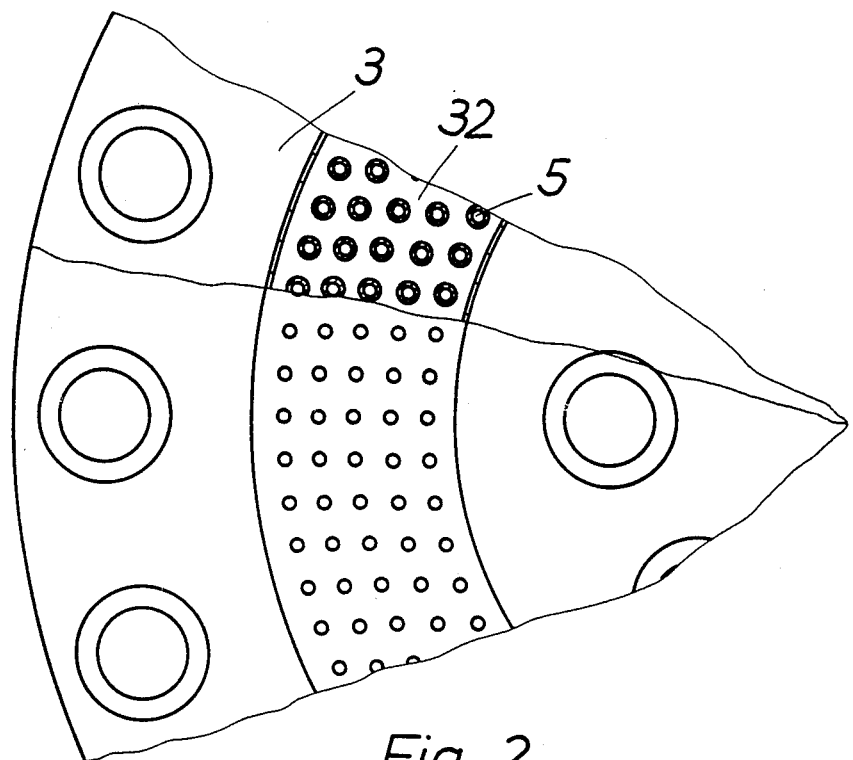
FIG. 2 is a front view of a portion of the granulating device in FIG. 1 without its covering and partially broken away.

As can be seen in particular in FIG. 2, the extruder nozzles 5 are arranged in an annular region 32 of the perforated plate 3 which corresponds to the path of travel of the knife 10 of the knife head 9.

Figure 3:
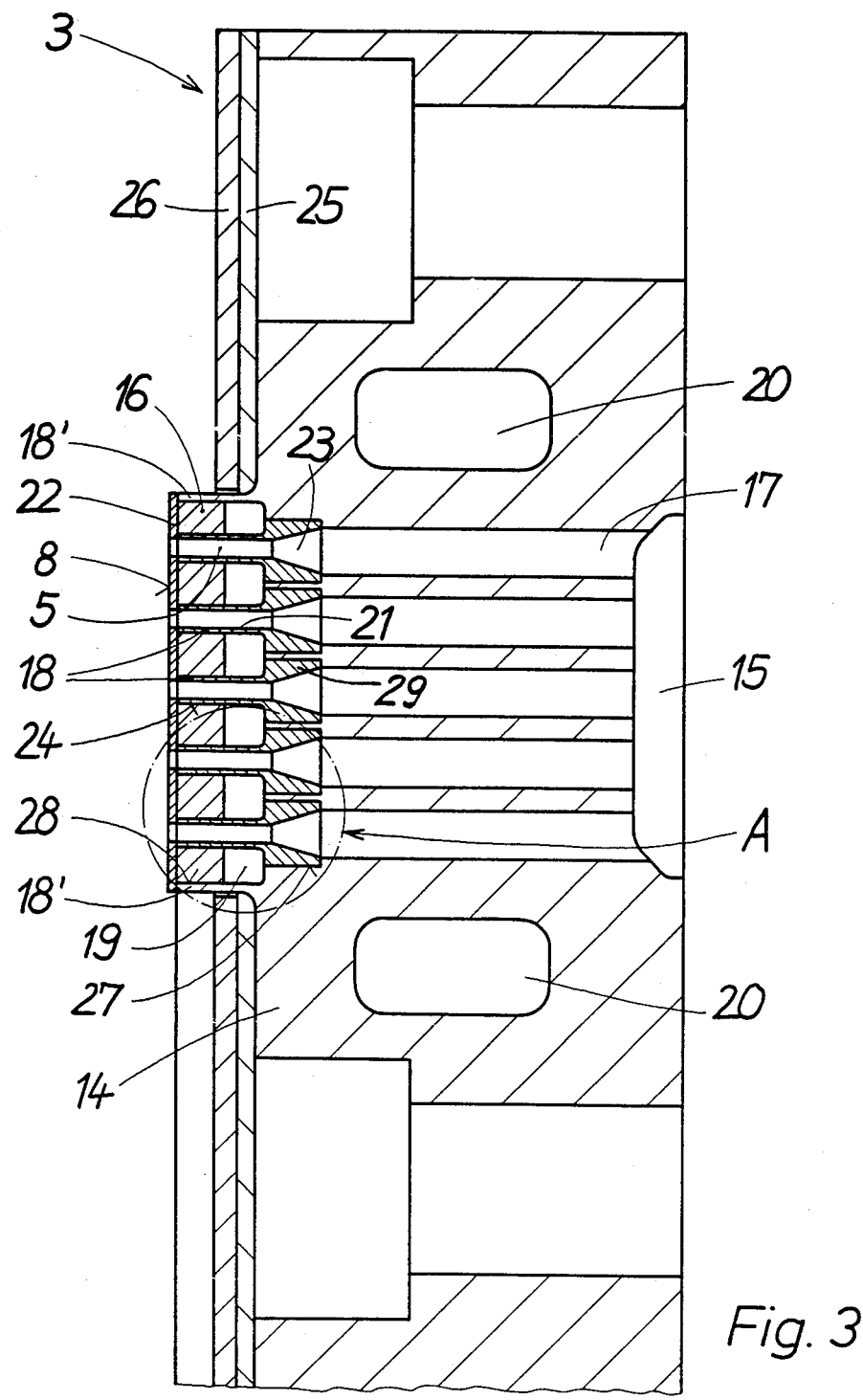
FIG. 3 shows a portion of the granulating device in FIG. 1 on a larger scale.

As shown in further detail in FIG. 3, the perforated plate 3 has a construction formed by a base plate 14 having a distributor channel 15 into which the channels 6 of the head part 2 open and a cutting plate 16 into which inlet channels 17 for the supply of melt to the extruder nozzles 5 open via individual conical inlet passages 23.

The cutting plate 16 is attached to the base plate 14 by a number of freely extending hollow, tubular elements 18 which are securely anchored by inserts 29 in cylindrical recesses 27 in the base plate 14. The tubular elements 18 are anchored in cylindrical recesses 24 in the cutting plate 16.

Such anchoring of the tubular elements 18 in both plates 14 and 16 is achieved, for instance, by brazing. Between the base plate 14 and the cutting plate 16 there is an insulating air gap 19 which is substantially coextensive with the cutting plate 16. The resulting free space between the base plate 14, which is heated by heating channels 20, and the cutting plate 16, which is cooled by cooling water in contact with the cutting surface 8, not only prevents the direct transfer of heat between the two plates but, at the same time, prevents the build-up of thermal stresses in the cutting plate 16 by the support thereof by the freely extending tubular elements 18. The tubular elements 18 are provided with passage bores 21 to form the extruder nozzles orifices 5. The tubular elements 18 are dimensioned in cross section in the region of the insulating air gap 19 so that they can readily and rapidly compensate for thermal expansions of the cutting plate 16 caused by the relatively high temperature differences between the base plate 14 and the cutting plate 16 in operation. In order to achieve this, the insulating air gap 19 has a depth of as much as 6 mm.

The cutting surface 8 of the cutting plate 16 is covered by a high-strength anti-wear layer 22 which has a crystalline structure not able to take up thermal stresses without damage. Due to the flexibility of the tubular elements 18 which reduce such thermal stresses in very small surface regions of the cutting plate 16, the anti-wear layer 22 remains unaffected thereby. The cutting surface 8 does not experience any change in the planarity of its surface either, so that a flat knife path is assured and the pressing pressure of the cutting knife 10 remains unchanged despite the prevailing thermal stresses.

If the insulating air gap 19 is to serve, if necessary, also for the control of the temperature of the cutting plate 16, the plate 16 is covered in liquid-tight manner at its inner and outer peripheral surfaces by freely extending webs 18' of the plate 3.

In this case, the cross section of the webs 18' is controlled by a milled recess 28 in the base plate 14 so that it is able to compensate for thermal stresses of the cutting plate 16.

An insulating plate 25 insulates the base plate 14 and is covered by a protective steel plate 26. The insulating plate 25 and cover plate 26 are recessed behind the cutting plate 16.

Figure 4:
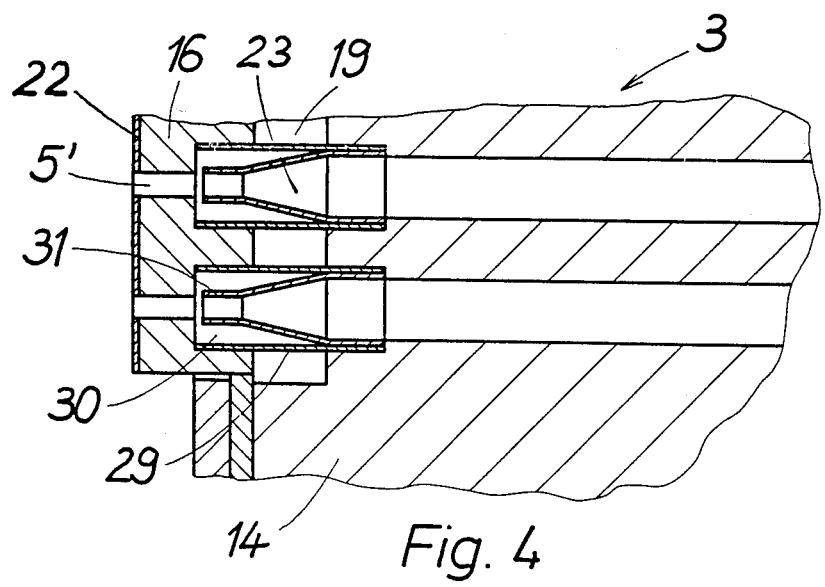
FIG. 4 shows a detail A of the granulating device in FIG. 3 with a different construction of the arms and the extruder nozzles.

FIG. 4 shows another embodiment in which can be seen perforated plate 3 with cutting plate 16A secured thereon and providing insulating air gap 19. The plate 16A is securely supported by freely extending tubular metallic inserts 29 in the base plate 14. Within the inserts 29, in the region of the insulating air gap 19 and of the cutting plate 16A, there is formed in each insert an annular hollow space 30 which is bounded on the outside by the corresponding insert 29 and on the inside by an inner insert member 31 having an outlet facing and coaxial with a respective extruder orifice 5' and a conical section 23'. The tubular insert 29 occupies a minimum cross section, at least in the region of the insulating air gap 19, so that a free compensation for the thermal expansions within the cutting plate 16A, and thus also of the anti-wear layer 22, is assured.

With this arrangement, the feed of the melt is advantageously separated from the arrangement for the support of the cutting plate 16A which is effected by the inserts 29. The inserts 29 are so dimensioned that a sufficiently stable stress-compensating support of the cutting plate 16A is provided. Furthermore, the heat transfer from the heated base plate 14 to the cutting plate 16A remains limited to a minimum so that a uniform temperature is established without difficulty in the region of the cutting plate 16A, regardless of the temperature of the cooling water.

Thermal stresses which customarily occur as a result of locally occurring temperature differences within the cutting plate 16 or 16A are taken up by the tubular elements 18, the webs 18' and inserts 29, without stresses being built-up in the cutting plate.

Although the invention has been described in relation to specific embodiments thereof, it will become apparent to those skilled in the art that numerous modifications and variations can be made within the scope and spirit of the invention as defined in the attached claims.

What is claimed:

1. In a perforated plate construction for underwater granulating of plastic strands comprising a base member having a melt distributor channel for molten plastic material and a plurality of inlet channels connected to said distributor channel, a cutting plate having outlets for discharge of the plastic material as strands therefrom, extruder nozzles connecting said inlet channels and said outlets for discharge of the plastic material as strands therefrom, extruder nozzles connecting said inlet channels and said outlets, said extruder nozzles including conically tapered portions, heating means in said base member in the region of the inlet channels, and an insulating means between said base member and said cutting plate and through which said extruder nozzles pass, the improvement wherein said insulating means is constructed as an insulating air gap which adjoins the cutting plate and extends substantially entirely thereacross and a plurality of separate support members extend through said air gap and support said cutting plate on said base plate in spaced relation therewith so as to form said air gap between the base plate and cutting plate to be of substantially constant, uniform depth such that said cutting plate can undergo free thermal deflection relative to said base plate, each of said support members comprising a tubular insert member having a conical portion communicating with a respective inlet channel, said tubular insert member being fitted in said base member and in said cutting plate.

2. The improvement as claimed in claim 1 wherein said separate support members are integral with said extruder nozzles.

3. The improvement as claimed in claim 1 wherein said extruder nozzles extend within said cutting plate.

4. The improvement as claimed in claim 1 comprising spaced projections on said base member surrounding said cutting plate and forming inner and outer bounding surfaces for said air gap.

5. The improvement as claimed in claim 1 wherein each tubular insert member comprises a cylindrical outer element fitted in said base member and said cutting plate and an inner element within the outer element and including said conical portion.

6. The improvement as claimed in claim 5 wherein said cylindrical outer element tightly embraces said inner element to provide a minimized diameter at said gap.

7. The improvement as claimed in claim 6 wherein said cutting plate is an annular member having inner and outer peripheral surfaces, said base member including annular projections spaced radially from one another and surrounding said peripheral surfaces of said cutting plate to enclose said air gap circumferentially.

8. A perforated plate construction for a granulating device for underwater granulating of extruded strands of thermoplastic material, said perforated plate construction comprising:
    a base plate having a distributor channel for receiving molten thermoplastic material, and a plurality of inlet channels connected to said distributor channel for conveying the molten thermoplastic material therefrom,
    a cutting plate secured to said base plate in spaced relation to define an insulating air gap therebetween, said cutting plate having extruder orifices therein through which the molten thermoplastic material can flow for discharge as strands to a granulating knife for underwater granulating of the thermoplastic material,
    said insulating air gap extending across substantially the entire said cutting plate, heating means in said base plate for heating thermoplastic material in said inlet channels, and
    support means secured to said base plate and projecting therefrom through said air gap for supporting said cutting plate in said spaced relation from said base plate, said support means conveying the thermoplastic material from said inlet channels to said cutting plate for discharge therefrom, said support means comprising a plurality of individual spaced elements freely projecting from said base plate through said air gap to permit said cutting plate to undergo thermal expansion independently of the base plate, each of said projecting elements comprising an insert inserted into said base plate and extending into said cutting plate to form said extruder orifices therewithin, each said insert including an outer tubular member and an inner tubular member within the outer member and communicating with a respective inlet channel for conveying molten thermoplastic material, said inner tubular member including a conical portion.

9. A plate construction as claimed in claim 8 wherein said cutting plate is an annular member having inner and outer peripheral surfaces, said base plate including radially spaced inner and outer projecting webs surrounding said peripheral surfaces of said cutting plate to enclose said air gap circumferentially.

10. A perforated plate construction for a granulating device for underwater granulating of extruded strands of thermoplastic material, said perforated plate construction comprising:
    a base plate having a distributor channel for receiving molten thermoplastic material, and a plurality of inlet channels connected to said distributor channel for conveying the molten thermoplastic material therefrom,
    a cutting plate secured to said base plate in spaced relation to define an insulating air gap therebetween, said cutting plate having extruder orifices therein through which the molten thermoplastic material can flow for discharge as strands to a granulating knife for underwater granulating of the thermoplastic material,
    said insulating air gap extending across substantially the entire said cutting plate, heating means in said base plate for heating thermoplastic material in said inlet channels, and
    support means secured to said base plate and projecting therefrom through said air gap for supporting said cutting plate in said spaced relation from said base plate, said support means conveying the thermoplastic material from said inlet channels to said cutting plate for discharge therefrom, said support means comprising a plurality of individual spaced elements freely projecting from said base plate through said air gap to permit said cutting plate to undergo thermal expansion independently of the base plate, said base plate including webs surrounding said cutting plate and forming inner and outer bounding surfaces for said air gap.

11. A plate construction as claimed in claim 19 wherein said cutting plate is an annular element with a plurality of said extruder orifices distributed therein.

12. A plate construction as claimed in claim 11 wherein said extruder orifices are constituted as bores in said cutting plate.

13. A plate construction as claimed in claim 11 wherein each projecting element extends at least in part in a respective extruder orifice in said cutting plate.

* * * * *